March 11, 1924. Re. 15,792

W. E. WINE

CAR DOOR LOCK

Original Filed Jan. 10, 1922

Inventor:

William E. Wine by Ritter & Mechlin his attys.

Reissued Mar. 11, 1924. Re. 15,792

UNITED STATES PATENT OFFICE.

WILLIAM E. WINE, OF TOLEDO, OHIO.

CAR-DOOR LOCK.

Original No. 1,472,540, dated October 30, 1923, Serial No. 528,245 filed January 10, 1922. Application for reissue filed January 28, 1924. Serial No. 689,136.

*To all whom it may concern:*

Be it known that I, WILLIAM E. WINE, a citizen of the United States of America, residing at Toledo, in the county of Lucas and State of Ohio, have invented certain new and useful Improvements in Car-Door Locks, of which the following is a specification.

My invention relates to new and useful improvements in car door locking means, and more particularly to locks that are adapted to support and retain the doors of a hopper car in their closed position.

One of the objects of the present invention is to provide a locking device that is exceedingly simple in construction, readily assembled, cheap to manufacture and easily and readily secured to the car doors.

As is well known to those skilled in the art, the hoppers in a car are angularly disposed with relation to the car floor and the doors are swung from a point at the top of the sides of the hopper.

The present invention contemplates a hook secured to the outside of the hopper while the lock comprises a body plate on which are a latch and dog, the plate being secured to the lower end of the door and at the side thereof. Although only one hook and one lock are shown in the drawings, it will, of course, be understood that a similar hook and the cooperating latch will be supplied for the other side of the hopper and door so that the door will be sustained and locked from its opposite outer corners.

With these and other objects in view, the invention consists in certain new and novel arrangements and combinations of parts as will be hereinafter more fully described and pointed out in the claims.

Referring now to the drawings showing a preferred form of my invention:

Figure 1:
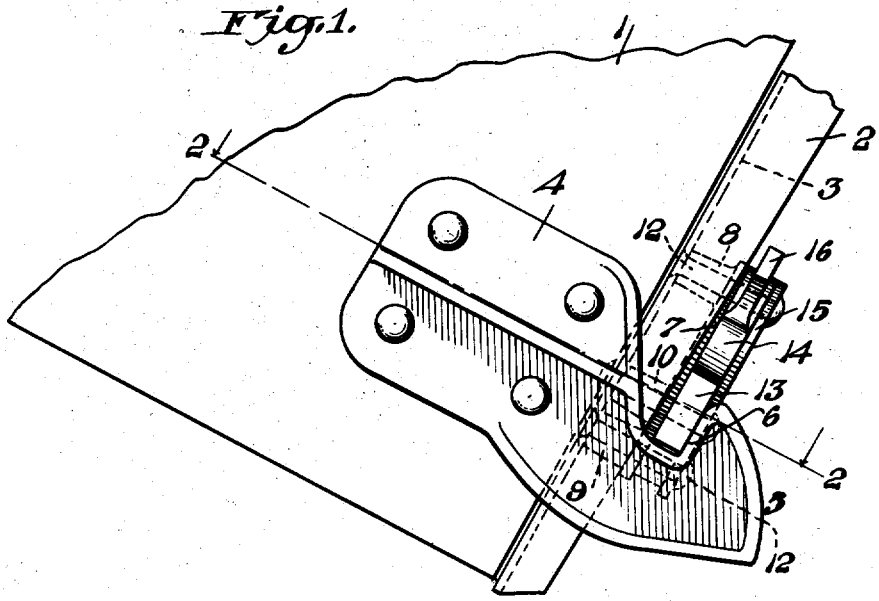
Fig. 1 is a fragmentary view of the side of a hopper showing the hook fastened thereon and the lock secured to the hopper door, a fragmentary portion of the door being shown in closed position.
Figure 2:
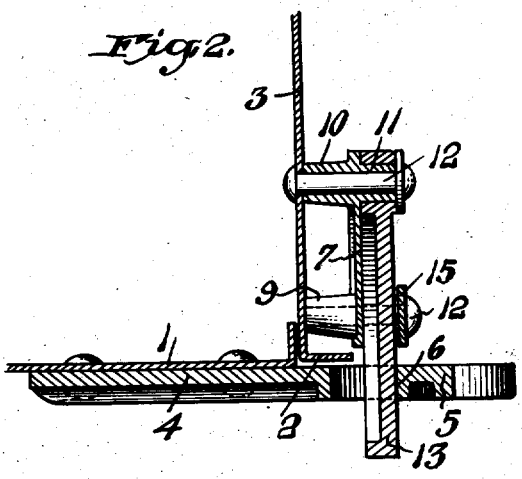
Fig. 2 is a sectional view taken on the line 2—2 of Fig. 1, looking in the direction of the arrow.

Referring now to the several figures, a fragmentary portion 1 of the side plate of a hopper is shown together with an outer flange 2 on a hopper door 3. The hinge point of the door 3 is not shown, but it will be understood that it is at a point near the top of the hopper. Securely riveted to the side of the hopper is a casting 4 having its lower end formed in the shape of the hook 5 which extends beyond the outer edge of the hopper plate and beyond the flange 2 of the door 3. This hook 5 has the supporting ledge 6 formed thereon in parallel relation with the outer free edge of the hopper side plate 1 and the plane of the door 3.

Securely riveted to the bottom of the door 3 and directly behind the flange 2 is the triangular bracket plate 7 provided with the integral bosses or posts 8, 9 and 10 which extend beyond the opposite sides of the plates and are each drilled as at 11 for the reception of rivets 12.

Figure 3:
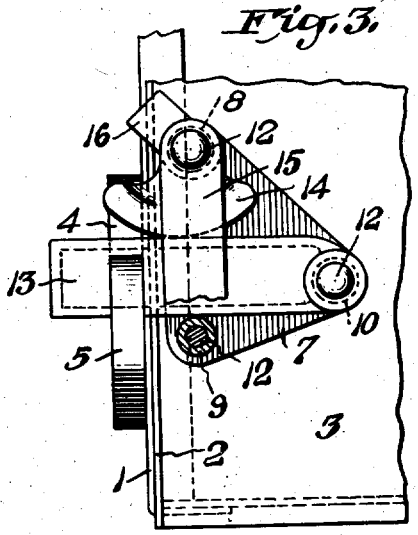
Fig. 3 is an elevational view looking at right angles to the plane of the door, showing the lock secured to the bottom of the door.

The portions of the bosses 8, 9 and 10 on the inner side of the plate form legs which rest on the bottom of the door 3 and through which the rivets 12 are passed so that the outer side of the plate 7 will extend in a plane below that of the outer edge of the flange 2. The portions of the bosses 8 and 10 which extend from the opposite side of the plate 7 form pivotal bearings extending normal to the plane of the door for the reception of a pivotal latch 13 and a dog 14 adapted to swing parallel to said door. The lower boss 9 at this side of the plate and the upper boss 8 have a strap 15 riveted to them to retain the dog 14 and hold the latch 13 from lateral movement, while the downward movement of the latch 13 will be limited by the boss 9 as may be clearly seen in Fig. 3.

The location of the casting 4 with relation to the plate 7 is such that when the door is closed and the latch 13 is in its locked position, as shown in the different figures, said latch will rest on the ledge 6 of the hook and cannot be lifted or removed from this position until the dog 14 is swung rearwardly, which may be done by striking the outwardly extending lug 16 of the dog with a hammer or other instrument.

The casting 4 as well as the plate 7 and latch 13 may be slightly cored or ribbed as shown in the several figures to provide sufficient strength for these members, as these locking devices, as a whole, must be relatively strong, since the doors and the load are comparatively heavy.

The shape of the lower outer edge of the hook 5 is such that it will raise the latch as the door is swung to its closed position so that the latch will drop into place on the ledge when the door is in its final or closed position. In other words, the latch will drop in place on the closing of the door and will there be further securely held in place by the jamming of the dog into position.

When the dog or cam 14 is forced to locked position the resulting wedging action of this part between the latch 13 and the bracket 7 upon which the dog is pivotally mounted communicates an upward thrust to said bracket and to the door upon which the latter is secured, thereby causing the door 3 to be supported and maintained against sagging and shifting on its hinges endwise of the door. The fixed hooks 5 which are secured to the opposite sides of the hopper overlap the side edges of the door and cooperate therewith to prevent any substantial sidewise movement of the door when the latter is in closed position. It will be appreciated that the disadvantages incident to shifting movements of the doors when the car is in service are substantially eliminated in a structure embodying my invention.

From the foregoing it will be seen that the door may be provided with the outwardly extending flange 2 which will strengthen the door and also shelter the bosses or posts on the plate 7 from injury, while at the same time the flange does not offer any obstruction to the locking device as these bosses are of sufficient length to hold the lock beyond the lower edge of the flange.

It will also be seen that I have provided a lock which is extremely simple, that will drop into place when the door is closed and on the other hand cannot become accidentally disengaged in use.

Although I have shown the locking device in conjunction with a hopper door, it will be understood that the device might well be used with drop bottom doors on cars of other types.

Many slight changes may be made without in any way departing from the spirit and scope of the invention.

What I claim as new and desire to secure by Letters Patent is:—

1. A door locking device comprising a body plate having posts formed thereon, said posts extending beyond the opposite sides of said plate, a latch pivotally secured to one of said posts, and a dog pivotally secured to another of said posts, the lowermost post forming a lower limit of movement for said latch.

2. A car door locking device comprising a body plate, three posts arranged upon and extending transversely on each side of said body plate, the portions of the posts on the inner side of the plate forming legs adapted to be secured to a door, a dog pivotally secured to one post on the outer side of said plate, and a latch pivotally secured to another of said posts, one of the posts on the outer side of the plate forming a limit for the movement of said latch away from said dog.

3. In combination with a hopper and a door having an outwardly extending flange thereon, a hook secured to the side of the hopper, a body plate secured to the bottom of the door, legs integrally formed on one side of said plate, and pivotally disposed bosses on the other side of said plate, said legs and said bosses forming transversely arranged posts provided with openings therein, a latch member pivotally mounted on one of said bosses, a dog mounted on another of said bosses, the lowermost boss forming a stop for the said latch, and a strap connected with the lowermost boss and the boss forming a pivotal point for said dog, said latch cooperating with said hook when the latch is in its lower position to retain the door in closed position.

4. In combination with a hopper and door, a hook secured to the side of said hopper, a body plate, posts extending on opposite sides of said body plate, the portions of said posts on one side of the plate forming legs adapted to be secured to the door, and the portions of the posts on the opposite side of the plate forming respectively pivotal posts and a stop, a latch secured to one pivotal post and a dog mounted on the other of said pivotal posts, and a strap connecting the pivotal post of the dog and the stop to retain the dog and latch member on said pivotal posts, said latch member resting on said hook and being held against movement when the door is in its closed position, and said dog forming locking means for said latch.

5. A car door locking device including in combination with a swinging door having an out-turned flange formed along one of its edges, a plate secured to the outer face of the door near the said flanged edge thereof, a locking bar pivoted upon the plate, the same overlying the said flange and extending beyond the edge of the door, a stationary hook secured to the car side and arranged for cooperation with the said locking bar, and a dog pivotally associated with the said locking bar and arranged to retain the same in engagement with the said hook.

6. The combination with a hopper, of a door hinged thereto and adapted to close the opening thereof, a pair of fixed hooks adapted to be secured to the opposite sides of said hopper adjacent the side edges of said door, a pair of pivoted latches carried by said door and each adapted to cooperate with one of the said fixed hooks, a dog pivotally connected to said door adjacent each of said latches, said dogs being adapted to maintain said latches in engagement with said hooks, said hooks, latches and dogs cooperating to prevent sliding movement of said door with respect to the hinge pintles thereof.

7. The combination with a hopper, of a door pivoted thereto and adapted to close the opening thereof, a pair of fixed hooks connected to the side walls of said hopper, portions of the said hooks being adapted to lie adjacent the side edges of said door, brackets connected to said door, said brackets each having pivotally connected thereto a latch member cooperating with the said adjacent hook, and a dog adapted to overlie said latch, said dogs when in locked position preventing disengagement between said latches and hooks, the said hooks cooperating with the side edges of said door to prevent sidewise movement thereof, and said hooks, latches and dogs cooperating to prevent bodily endwise movement of said door.

8. A car door locking device including, in combination with a swinging door, a latch pivotally mounted upon the outer face of said door and extending beyond the edge thereof and adapted to swing in a plane substantially parallel to said door, a stationary hook secured to the car side and adapted to cooperate with said latch to lock said door against opening movement, and means adapted to engage said latch for preventing the latter from executing a pivotal unlocking movement with respect to the door when the latter is closed and said latch is in locking engagement with said hook.

9. A car door locking device including, in combination with a swinging door, a latch carried by said door and extending beyond the edge thereof, said latch being upon the outside of said door and being adapted to have pivotal movement on an axis extending at an angle to the plane of said door, a hook member secured to the car side and adapted to engage said latch to lock said door in closed position, and means for maintaining said latch in fixed relation to said door when the latter is in closed position.

10. In a car door locking device, the combination with a hopper and a swinging door adapted to close the discharge opening of said hopper, of a pair of hooks rigidly secured to the side walls of said hopper, portions of said hooks being disposed adjacent the side edges of said door and being adapted to cooperate with said edges to prevent substantial sidewise movement of said door, a pair of pivoted latches carried by said door, and each adapted to engage one of said hooks, each of said latches being adapted to have pivotal movement on an axis extending substantially normal to the plane of the door, and a plurality of means respectively cooperating with said latches for preventing the latter from executing pivotal unlocking movements with respect to the door when said latches are in locking engagement with their corresponding hooks.

In testimony whereof I affix my signature.

WILLIAM E. WINE.